United States Patent [19]
Brazier et al.

[11] 3,840,427
[45] Oct. 8, 1974

[54] TRIPLEX FILMS WITH NYLON AS A LAMINATING LAYER

[75] Inventors: Irvin L. Brazier; Bentley W. Elliott, both of Milwaukee, Wis.

[73] Assignee: Milprint, Inc., Milwaukee, Wis.

[22] Filed: July 26, 1972

[21] Appl. No.: 275,371

[52] U.S. Cl............. 161/227, 117/161 P, 156/244, 156/272, 161/247, 161/402, 161/412, 161/190, 161/214, 161/228, 161/229, 426/127
[51] Int. Cl........................ B32b 27/34, B32b 27/06
[58] Field of Search ........... 161/227, 411, 412, 402, 161/247; 250/324; 156/272, 244; 117/161 P

[56] References Cited
UNITED STATES PATENTS

| | | | |
|---|---|---|---|
| 2,828,237 | 3/1958 | Rosser | 161/228 |
| 3,184,358 | 5/1965 | Utz | 161/247 |
| 3,329,549 | 7/1967 | Vilutis | 156/272 |
| 3,360,412 | 12/1967 | James | 156/272 |
| 3,515,702 | 6/1970 | Raabe | 161/227 |
| 3,570,748 | 3/1971 | Coyle | 161/402 |

FOREIGN PATENTS OR APPLICATIONS

| | | | |
|---|---|---|---|
| 7,009,174 | 12/1970 | Netherlands | 156/272 |

OTHER PUBLICATIONS
T888001 G.M. Drake, Defensive Publication, July 20, 1971.

Primary Examiner—George F. Lesmes
Assistant Examiner—Ellis P. Robinson
Attorney, Agent, or Firm—Donald G. Casser

[57] ABSTRACT

Flexible packaging films with at least three layers comprising an unprimed polyolefin first film and a second film as exterior layers which are joined together with nylon as an interior layer for laminating the two exterior films together. Other layers or coatings may be applied to the exterior layers.

1 Claim, No Drawings

TRIPLEX FILMS WITH NYLON AS A LAMINATING LAYER

BACKGROUND OF THE INVENTION

1. Field

This invention relates to the art of joining two films to each other by means of an intermediate laminating layer.

2. Prior Art

While nylon has been used as an interior layer between two other layers in a flexible packaging film, it has not, as far as presently known, been used as a laminating adhesive medium between films.

For example, U.S. Pat. No. 3,423,231 discloses multiple layer composite films having a nylon layer between two outer layers. However, the nylon inner layer in the construction shown in this patent does not function as an adhesive layer which bonds the two outer layers firmly together to form an integral structure. Instead, an ethylene-vinyl acetate copolymer is used as an adhesive layer between the nylon and the outer layers in the composite films shown in the patent.

Other art relating to nylon is set out in DuPont's "Zytel Nylon Resins Extrusion Manual," numbered A-69784. This manual discloses various applications of nylon including film extrusion, coextrusion, and extrusion coating of nylon onto various substrates such as polyethylene, paper, foil, etc. However, the manual does not disclose the use of nylon as an interior stratum of a three-layer film which serves to bond the outer layers together. Also, the manual states (on page 29) that a non-porous substrate such as polyethylene film should be primed before it is extrusion coated with nylon.

U.S. Pat. No. 3,570,748 also discloses the extrusion coating of nylon onto a primed polyolefin surface. The nylon is applied in a melted condition to the polyolefin substrate. The patent shows the addition of a saran coating over a nylon layer that has been extrusion coated onto a polyolefin substrate in which the saran is applied after the nylon was cooled and primed. Also, the patent states it is essential to coat the polyolefin substrate with an adhesive-promoting primer before extrusion coating nylon onto it in addition to first subjecting the polyolefin to oxidative influences prior to priming.

SUMMARY OF THE PRESENT INVENTION

Our present invention, however, differs from the above prior art in that nylon is interposed between two pre-formed films and employed as a laminant or an adhesive for joining the two films together and thereby form a triplex composite structure. One of the films is to be a polyolefin, and the other may be selected from a wide variety of flexible films used in packaging.

In comparison to U.S. Pat. No. 3,423,231 the nylon intermediate layer in the film of the present invention is bonded directly to each of the two outer layers and serves as the means for joining the two outer films together. Thus an adhesive such as EVA between the nylon layer and the outer layers is not used in the films of the present invention.

In comparison to the DuPont extrusion manual discussed above, the polyolefin to which the nylon is joined is not first primed before contacted with the nylon, and the nylon is employed as a laminating adhesive layer as distinguished from the constructions shown in the manual.

In comparison to U.S. Pat. No. 3,570,748, the nylon is extrusion coated onto a polyolefin film which does not have a primer. Further, the nylon actually joins the polyolefin film to the other film of the triplex structure, and is not merely coated as shown in U.S. Pat. No. 3,570,748 after the nylon is cooled, subjected to oxidative influences and primed.

Among the principal objects of this invention are to employ nylon as an intermediate layer in a triplex packaging film construction in a new manner; to provide processes suitable for the production of composite films having at least three layers with nylon as the adhesive layer joining together two other films; to provide composite films employing a nylon intermediate adhesive layer which shows excellent physical characteristics indicating firm bonding of the several layers. Another main object is to simplify the construction of films employing nylon as a middle layer, and particularly to eliminate processing steps which have heretofore been thought necessary. A more specific object of this invention is to provide the particular details of films and methods as hereinafter claimed.

DESCRIPTION OF THE PREFERRED EMBODIMENTS

As stated previously, the present invention involves the joinder of a first layer of preformed flexible film and a second layer of preformed flexible film through an intermediate nylon layer which acts as a bonding medium to combine the two films into a unified and firmly bonded structure.

The first layer for use in construction of the composite triplex films of this invention is to comprise a polyolefin film. Various types of polyolefins such as used for flexible packaging films may be employed. These include low density polyethylene, medium density polyethylene, high density polyethylene, modified polyethylenes, polypropylene, ethylene-vinyl acetate copolymer and ethylene ionomer film (such as that sold under the trademark Surlyn). The polyolefin layer film be a transparent as typically used in packaging film constructions or it may be an opaque film containing pigments to provide, for example, a white layer. In general, the first film may be from about 1-10 mils in thickness, depending upon the particular end use to which the composite film is to be employed. The first layer being a polyolefin is to be subjected to corona discharge treatment in order to enhance its receptivity or adhesiveness to nylon. Electronic corona discharge treatment is known in the prior art, and is disclosed, for example, in U.S. Pat. Nos. 2,939,956 to George J. Parks and 3,018,189 to George W. Traver. Briefly, the process comprises advancing the polyolefin film past an electrode connected to a high frequency generator such as one which develops output power at a frequency of 450 kilocycles with an input current of 1½ kilowatts, 60 cycles at 150 or 230 volts.

The second film which is to be bonded to the first polyolefin film as described above in accordance with this invention may comprise a variety of films typically used in flexible packaging constructions. The second film may also be a polyolefin film such as low density polyethylene, biaxially oriented polypropylene, cast polypropylene, etc., but additional types of films may be employed, including non-polyolefin plastic films such as coated and uncoated polyester films, vinyl films, and nylon films. Still further, the second film can comprise cellophane, including saran coated cellophanes and nitrocellulose coated cellophanes; other cellulosic substrates such as paper, particularly sulfite paper, and glassine may be employed. Other nonplastic films which may be employed as the second film are metallic foils, most generally aluminum foil. The second film will also typically be in the range of about 1 mil to 10 mils in thickness for most packaging uses, although films thinner and thicker than this range may be employed if so desired. The second film as herein described is to be coated with an adhesion-promoting primer for increasing its adherency to the nylon which is to be intermediate adhesive laminant layer. Various types of primers suitable for such use are known to those skilled in the art, suitable for such as urethane primers, polyester primers, and alkylene imines such as polyethylene imine. All of the films described above as the second film should be primed, except that as shown in the examples hereinafter, it has been discovered that biaxially oriented polypropylene when used as the second film does not require a primer in order to achieve suitable bond strengths.

The nylon layer which is employed as an intermediate adhesive laminating medium according to the present invention may be any of the usual types of extrusion grade nylon polyamides, including nylon 6, nylon 66, nylon 610, nylon 7, nylon 9 and nylon 11. The nylon layer itself may be relatively thin and still provide strong bonding between the two exterior films; for example, a nylon layer on the order of one-half mil thick is satisfactory, although thicker layers may be used consistent with the intended end use of the finished film and the required economy. Thus, in general, the nylon layer may be from about ½ to 2 mils thick for most applications, it being understood that both thinner and thicker nylon layers will also be useful. Nylon may be applied between the two outer films according to two different processes.

Process A — the nylon is extrusion coated into the nip between the advancing webs of the first and second films. Nylon pellets according to this process are melted in an extruder, and the nylon itself is melted at the time it contacts both the first and second film simultaneously. This is a typical extrusion coating process as may be employed, for example, with polyethylene.

Process B — nylon is melted and extrusion coated in a melted condition onto an advancing web of a treated, unprimed first film comprising the polyolefin member of the composite film. Thereafter, the nylon layer is cooled to below its film-forming temperature, down to as low as about 100°F, following which the exposed nylon surface, now cooled, is joined to an advancing web of the second film. Suitable pressure may be applied to effect joinder in the desired manner.

In Examples 1-13, the first layer of the various film constructions was a two mil thick film of low density polyethylene (Dow 400). Each example used a different film as the second film in the construction. A nylon intermediate layer was applied at a weight of 8 pounds per ream of film surface (a ream being 3,000 sq. ft.) to form an intermediate layer approximately 0.5 mils thick. Nylon 6 was used in these examples. The surface of the polyethylene first film to which the nylon was joined was first subjected to corona discharge treatment, but no primer was used between it and the nylon. The physical properties of yield strength, elongation and tensile strength of the composite films were determined according to procedures of ASTM D-882. The heat seal strength of each film was determined by heat sealing two strips of film together along contacting portions of the first layer of each strip, at a jaw pressure of 30 psi and a dwell time of 1 second at the temperatures noted in these examples. Results are expressed as the strength of the heat seal bond in grams per inch of width, determined by pulling apart the bonds on a Sentinel tensile tester.

Example 1

The 2 mil thick low density polyethylene first film was subjected to corona discharge treatment. The nylon layer was applied onto the corona treated, unprimed surface of the polyethylene first film, and the nylon was joined to the primed surface of a cellophane second film. The second film was 250 K cellophane (cellophane coated on both sides with saran) which had been first primed on one surface with a urethane adhesion-promoting primer. The composite film was firmly bonded together. It had a yield strength of 5,300 psi in the machine direction and 3,600 psi in the transverse direction; an elongation of 20 percent in the machine direction and 56 percent in the transverse direction; and a tensile strength of 6,900 psi in the machine direction and 4,100 psi in the transverse direction. Contacting portions of the first layer of the film with heat sealed to each other at 350°F had a heat seal strength of 9,100 grams per inch of width.

Example 2

A film according to Example 1 was made except that a 50 gauge polyethylene terephthalate (Mylar) film with a saran coating was used as the second film, with the urethane adhesion-promoting primer applied over the saran coating. The nylon layer was applied between the corona discharge treated unprimed surface of the first film and the primed surface of the second film. The resulting composite film had a yield strength of 5,300 psi in the machine direction and 5,100 psi in the transverse direction; the elongation was 140 percent in both the machine and transverse directions; the tensile strength of the composite film was 6,600 psi in the machine direction and 6,100 psi in the transverse direction. Heat seals formed between contacting portions of the polyethylene first films of strips of the film produced strengths of 7,750 grams per inch of width at 325°F.

Example 3

A film according to Example 2 was made except that a 50 gauge uncoated polyethylene terephthalate (Mylar) film was used in the second film. The resulting composite film had a yield strength of 5,500 psi in the machine direction and 4,500 psi in a transverse direction; an elongation of 160 percent in the machine direction and 71 percent in the transverse direction; and a tensile strength of 6,500 psi in the machine direction and 6,700 psi in the transverse direction. A heat seal strength of 7,350 grams per inch of width was obtained at a sealing temperature of 350°F, joinder being affected between contacting portions of the first layer of two strips of the composite film.

Example 4

A film according to Example 1 was made using 195 MBO cellophane (cellophane coated on one side with nitrocellulose coating) as the second film with its uncoated surface primed and joined to the nylon. The resulting composite film had the layers firmly joined to one another. Its yield strength was 6,500 pounds psi in the machine direction and 4,900 psi in the transverse direction. The film had an elongation of 24 percent in the machine direction and 47 percent in the transverse direction, and a tensile strength of 8,900 psi in the machine direction and 6,500 psi in the transverse direction. Heat seals formed at 350°F, had a strength of 8,300 grams per inch of width.

Example 5

A film according to Example 1 was made using a 100 gauge thick second film of uncoated biaxially oriented polypropylene. The resulting composite film had a yield strength of 4,100 pounds, elongation of 80 percent and tensile strength of 12,500 psi in the machine direction; and a yield strength of 3,800 psi, 76.5 percent elongation and 10,700 psi tensile strength in the transverse direction. The heat seal strength was 6,650 grams per inch of width when formed at 325°F.

Example 6

A film according to Example 5 was made except that the biaxially oriented polypropylene second film was 75 gauge in thickness. In the machine direction, the yield strength of the composite film was 2,600 psi, elongation 82 percent, and tensile strength 7,800 psi; in the transverse direction the yield strength was 2,000 psi, elongation 89.5 percent and tensile strength 6,900 psi. Heat seals formed at 325°F, had a strength of 4,950 grams per inch of width.

Example 7

A film according to Example 5 was made except that the second film 100 gauge biaxially oriented polypropylene with a saran coating on one side which was primed and joined to the nylon. The resulting composite film in the machine had a yield strength of 4,600 psi, elongation of 170 percent, and tensile strength of 7,200 psi; in the transverse direction its yield strength was 4,200 psi, elongation 170 percent and tensile strength 5,800 psi. Heat seal bonds of 7,950 grams per inch of width were formed at 325°F.

Example 8

A film according to Example 7 was made except that the saran coated biaxially oriented polypropylene had no adhesion-promoting primer on its surface joined to the nylon middle layer. The resulting composite film had the layers firmly bonded together. In the machine direction, its yield strength was 5,700 psi, elongation 170 percent and tensile strength 9,400 psi; in the transverse direction, its yield strength was 5,400 psi, elongation 150 percent and tensile strength 7,500 psi. Heat seals of 7,300 per inch of width were formed at 325°F.

Example 9

A film according to Example 5 was made except that the second film was a three mil thick film of cast polypropylene. In the machine direction, the yield strength of the composite film was 3,200 psi, elongation 670 percent and tensile strength 4,900 psi; in the transverse direction, its yield strength was 3,000 psi, elongation 650 percent and tensile strength 3,600 psi. Heat seals formed at 325°F had a strength of 5,850 grams per inch of width.

Example 10

A film according to Example 1 was made except that the second film was 60 gauge biaxially oriented nylon. The resulting film had the several layers firmly bonded together with the nylon middle layer, and had a heat seal strength of 7,100 grams per inch of width, with heat seals formed at 325°F. The yield strength measurements were 4,200 psi (MD) and 4,000 psi (TD); elongation was 98 percent (MD) and 81.5 percent (TD); and the tensile strength was 8,500 psi (MD) and 7,800 psi (TD).

Example 11

A film according to Example 10 was made except that the second film was three mil thick nylon 6 (Capran 77C). The physical properties of the composite film in the machine direction were yield strength 5,200 psi, elongation 580 percent and tensile strength 9,500 psi; in the transverse direction, the yield strength was 4,600 psi, elongation 650 percent and tensile strength 9,100 psi. At 350°F, a heat seal strength of 6,700 grams per inch of width was obtained.

Example 12

A film according to Example 1 was made using a five mil thick low density polyethylene as the second film. The physical properties of the resulting film were a yield strength of 1,600 psi in both the machine and transverse directions; elongation of 580 percent in the machine direction and 420 percent in the transverse direction; and a tensile strength of 3,200 psi in the machine direction and 1,900 psi in the transverse direction. A heat seal strength of 6,600 grams per inch of width was obtained at 325°F heat seal temperature.

Example 13

A film according to Example 1 was prepared except that the second film was a 2.5 mil thick film of aluminum foil with its surface joined to the nylon intermediate layer coated with an urethane adhesion-promoting primer. The yield strength of the composite film was 4,200 psi MD and 3,500 TD; the elongation of the film was 12 percent MD and 8.5 percent TD; and the tensile strength of the film was 9,100 psi MD and 7,300 psi TD. Heat seals formed at 325°F had a strength of 5,050 grams per inch of width.

In examples 14–16, the first film of the composite films therein described was a 1.5 mil thick film of low density polyethylene (Dow 400). The surface of the first film joined to the nylon layer was corona discharge treated, but unprimed.

Example 14

Sulfite paper with a basis weight of 26 pounds per ream (3,000 sq. ft.) had one surface coated with urethane adhesion-promoting primer. The primed surface of the second film was joined to the 1.5 mil polyethylene first film by means of a nylon middle layer at a weight of 8 pounds per ream, approximately 0.5 mils thick. In the machine direction, the yield strength of the composite film was 5,900, psi elongation 2.4 percent and tensile strength 5,900 psi; in the transverse direction, the yield strength of the film was 2,200 psi, elongation 5.9 percent and tensile strength 4,300 psi. The heat seal strength between contacting portions of the first layer of two strips of the film was 4,700 grams per inch of width with heat sealing at 350°F.

Example 15

A film according to Example 14 was made except that the second layer was glassine with a 25-pound basis weight. In the machine direction, the finished film had a yield strength of 7,000 psi, elongation of 2.6 percent and tensile strength of 7,000 psi; in the transverse direction, the yield strength as 2,200 psi, the elongation 12 percent and tensile strength 4,100 psi. Heat seals of 6,650 grams per inch of width were formed at 350°F sealing temperature.

Example 16

A film according to Example 14 was prepared except that the second layer was a 6 mil thick vinyl chloride film. The physical properties of the composite film for yield strength was 5,900 psi in both the machine and transverse directions, elongation was 220 percent in the machine and transverse directions, and its tensile strength was 5,600 psi in the machine direction and 5,200 psi in the transverse direction.

Examples 17–21 describe composite films using various polyolefins as the first film.

Example 17

A composite film was prepared according to this invention in which the first film was a 1.25 mil thick film of an olefin ionic copolymer (Sur-Flex), and the second film was saran coated biaxially oriented polypropylene with a 100 gauge thickness. The middle layer was nylon 6 applied at a weight of 8 pounds per ream, or about one-half mil thick. The nylon was bonded to a corona discharge treated surface of the first film and to the saran surface of the second film which had been coated with a urethane adhesion-promoting primer. The two films were firmly bonded together by the nylon. In the machine direction, the yield strength of the composite film was 4,700 psi, the elongation 165 percent, and the tensile strength 7,100 psi; in the transverse direction, the yield strength was 4,600 psi, elongation 150 percent and tensile strength 6,300 psi. The film formed heat seals at 350°F which had a strength of 3,700 grams per inch of width.

Example 18

A film according to Example 17 was made except that the first film was a 2.5 mil thick film of ethylene-vinyl acetate copolymer. The composite film had a yield strength of 3,300 psi MD and 3,600 psi TD, an elongation of 160 percent MD and 140 percent TD, and a tensile strength of 5,800 psi MD and 4,900 psi TD.

Example 19

A film according to this invention was made using a 1.5 mil thick film of polypropylene as the first film and 50 gauge uncoated polyethylene terephthalate film (Mylar) as the second film. Nylon joined the two films together between a corona discharge treated, unprimed surface of the first film and a surface of the second film coated with a urethane primer; the nylon was applied as in Example 17. The composite film had a yield strength of 6,600 psi MD and 5,200 psi TD, an elongation of 140 percent MD and 70 percent TD, and a tensile strength of 5,900 psi MD and 7,200 psi TD.

Example 20

A film was prepared according to Example 19 except that the first film was a 2 mil thick film of butyl rubber modified high density polyethylene (Visotherm A). In the machine direction, the composite film had a yield strength of 4,900 psi, elongation of 170 percent and a tensile strength of 5,700 psi; in the transverse direction the film had a yield strength of 4,300 psi, elongation of 65 percent and a tensile strength of 6,100 psi. At 350°F a heat sealing temperature, heat seal bonds of 2,900 grams per inch of width were obtained.

Example 21

A film according to Example 19 was prepared except that the first film was a 2 mil thick film of medium density polyethylene. In the machine direction the yield strength of the film was 5,400 psi, elongation of 160 percent and tensile strength 6,100 psi; and in the transverse direction, the yield strength was 4,600 psi, elongation 74 percent and tensile strength 6,700 psi. A heat seal strength of 3,400 grams per inch of width was obtained at the sealing temperature of 350°F.

Example 22

This example illustrates the use of a thicker layer of the nylon as the intermediate and adhesive layer. The first film was a 3 mil thick layer of low density polyethylene film (Dow 100) and the second film was a 50 gauge thick film of uncoated polyethylene terephthalate (Mylar). The first film had a surface treated with corona discharge and joined to the nylon, and the second film had a surface coated with a urethane primer and joined to the nylon. The nylon intermediate layer was applied at a weight of 20 pounds per ream of film surface, to form a layer about 1.25 mils thick. In the machine direction, the yield strength of the film was 3,300 psi, elongation 150 percent and tensile strength 3,700 psi; in the transverse direction, the yield strength was 3,000 psi, elongation 64 percent and tensile strength 4,700 psi. At 350°F sealing temperature, a heat seal strength of 4,050 grams per inch of width was obtained.

Example 23

A composite film was made using the polyethylene of Example 22 as a first layer and the polyester film of Example 22 as the second layer, in which the nylon was applied at a weight and thickness according to Example 19. The second film was primed with a polyethylene imine, which primed surface was joined to the nylon intermediate layer, and the polyethylene was corona discharge treated on its surface joined to the nylon, but not primed. In the machine direction, the yield strength of the composite film was 3,800 psi, elongation 43 percent and tensile strength 11,100 psi; in the transverse direction the yield strength was 5,100 psi, elongation 100 percent, and tensile strength 7,300 psi. Using a sealing temperature of 350°F, a heat seal strength of 4,500 grams per inch of width was obtained. This example illustrates the use of a primer other than urethane on the surface of the second film to be joined to the nylon intermediate layer.

The films of Examples 1–23 were made by applying the nylon according to Process A described hereinabove. In the following example, the nylon was applied by Process B.

Example 24

A film according to Example 7 was made except that the nylon intermediate layer was applied using Process B. The composite film had the first and second films firmly bonded together by the nylon layer. The physical properties of the composite films were yield strength 5,400 psi MD and 5,200 psi TD, elongation 145 percent MD and 130 percent TD, and tensile strength 8,100 psi MD and 6,600 psi TD.

Composite films made as herein described exhibit excellent bond strength between the two outer films and the nylon middle layer as evidenced by the physical properties of the films reported in the examples and as evidenced by the high heat seal strengths exhibited by the films. It was noted, however, that when nylon was applied only to the first film of the several constructions, its bonding thereto was erratic. Nylon was applied according to Process A to a corona discharge treated first surface of several first films of the preceding examples with the following results: no bond was obtained with the first film of Example 19, a bond of 20 grams per inch was obtained with the first film of Example 22, a bond of 70 grams per inch was obtained with the first film of Example 20, and a bond of 160 grams per inch was obtained with the first film of Example 18. The bonds between these films were too low to provide a functional film. On the other hand, bonds between nylon and a corona discharge treated surface of the first films of Examples 1, 16 and 17 were strong enough that the two layers could not be separated, thereby providing functional duplex packaging films made according to this disclosure. These results indicate that the addition of the second film in the triplex constructions of the present invention in some manner seems to enhance the bond between the nylon and the first film.

The packaging films disclosed herein are useful for packaging many types of articles and foods. They may be employed as wrappers, converted into pouches and bags and used as covers or lids for semi-rigid formed containers. Thus, the film of Example 4 was fabricated into pouches filled with 1½ pounds of prunes and tested on a shaker at 200 cycles per minute for two hours; only one of twelve packages developed a pinhole-type fracture failure while the other eleven showed no failures. Twelve control packages subjected to the same test all developed flex-fracture failures. On another test, film according to Example 1 was tested in the same manner but used to package 1 pound of elbow macaroni, and only one out of twelve packages showed flex-fracture failures; seven out of twelve control packages failed and product came out of the packages. Film according to Example 7 was made into pouches and gas-flushed packaged with two pounds of roasted ground coffee. The filled packages were shipped 1,000 miles by rail, examined for failures (there were none), vibrated for 30 minutes as described above, and subjected to a drop test, after which the packages were inspected. 35 of 36 packages so tested exhibited no failures, while 11 of 36 control packages made from a commercial film exhibited flex-fracture failures and abrasion.

We claim:
1. A flexible packaging film comprising the combination of:
   1. a first film of polyolefin material having a corona discharge treated surface;
   2. a second film of biaxially oriented polypropylene; and
   3. a nylon layer joined to the treated surface of the first film and joined to a surface of the second film to form a firmly bonded composite film, the nylon having been applied in a molten condition to the first film, said nylon being nylon 6, nylon 66, nylon 610, nylon 7, nylon 9 or nylon 11.

* * * * *